(12) United States Patent
Fischer

(10) Patent No.: US 11,607,072 B2
(45) Date of Patent: Mar. 21, 2023

(54) FILTER SYSTEM FOR PREPARING BEVERAGES BASED ON A BEVERAGE BASE

(71) Applicant: Felix Fischer, Pliezhausen (DE)

(72) Inventor: Felix Fischer, Pliezhausen (DE)

(*) Notice: Subject to any disclaimer, the term of this patent is extended or adjusted under 35 U.S.C. 154(b) by 153 days.

(21) Appl. No.: 16/619,974

(22) PCT Filed: Feb. 26, 2018

(86) PCT No.: PCT/DE2018/100166
§ 371 (c)(1),
(2) Date: Dec. 6, 2019

(87) PCT Pub. No.: WO2018/224070
PCT Pub. Date: Dec. 13, 2018

(65) Prior Publication Data
US 2021/0076865 A1      Mar. 18, 2021

(30) Foreign Application Priority Data

Jun. 8, 2017   (DE) .................. 10 2017 112 677.5

(51) Int. Cl.
*A47J 31/06*       (2006.01)
(52) U.S. Cl.
CPC .................. *A47J 31/0615* (2013.01)
(58) Field of Classification Search
CPC ............. A47J 31/0615; A47J 31/0621; A47J 31/0626; A47J 31/0605; A47J 31/06; A47J 31/057; A47J 31/053; A47J 31/3695; A47J 31/38
USPC ..................... 99/295, 279, 297, 299
See application file for complete search history.

(56) References Cited

U.S. PATENT DOCUMENTS

| 5,363,745 A | * 11/1994 | Lin ................. A47G 19/14 220/230 |
| 5,632,194 A | * 5/1997 | Lin ................. A47J 31/02 99/285 |
| 5,725,765 A | 3/1998 | Shen |
| 6,494,128 B1 | * 12/2002 | Yu .................. A47J 31/0605 99/285 |

(Continued)

FOREIGN PATENT DOCUMENTS

| CN | 2741454 | 11/2005 |
| CN | 2902066 | 5/2007 |

(Continued)

*Primary Examiner* — Tu B Hoang
*Assistant Examiner* — Vy T Nguyen
(74) *Attorney, Agent, or Firm* — Smartpat PLC

(57) ABSTRACT

A filter system for preparing beverages based on a beverage base, such as for example coffee powder, soup powder, or tea, comprises a filter or strainer provided for use in a container and by which the beverage base is introduced into the heated liquid of a first liquid-receiving compartment which is provided in the container and in which the filtered beverage base develops and gives off its ingredients to the liquid. The filter system includes a device which can be introduced into the container in order to form a second liquid-receiving compartment. The device comprises at least one flow-through opening for the liquid enriched with ingredients, which opening can be closed such that the beverage base cannot develop further in the liquid-receiving compartment formed by the device.

9 Claims, 3 Drawing Sheets

(56) References Cited

U.S. PATENT DOCUMENTS

| | | | |
|---|---|---|---|
| 7,997,186 B2* | 8/2011 | Shen Ku | A47J 31/4407 99/299 |
| 8,757,049 B2* | 6/2014 | Giessler | A47J 31/0615 99/306 |
| 2010/0224078 A1* | 9/2010 | Khalifa | A47J 31/20 99/323 |
| 2011/0083560 A1* | 4/2011 | Chen | A47J 31/38 99/279 |
| 2012/0024161 A1* | 2/2012 | Chen | A47J 31/10 99/299 |
| 2012/0024162 A1* | 2/2012 | Chen | A47G 19/14 99/316 |
| 2013/0160655 A1 | 6/2013 | Chen et al. | |
| 2014/0161940 A1 | 6/2014 | Aviles et al. | |
| 2014/0290494 A1 | 10/2014 | Chia | |
| 2015/0173562 A1 | 6/2015 | Priley | |

FOREIGN PATENT DOCUMENTS

| | | |
|---|---|---|
| CN | 104188535 A | 12/2014 |
| CN | 104884367 A | 9/2015 |
| DE | 29708492 U1 | 7/1997 |

\* cited by examiner

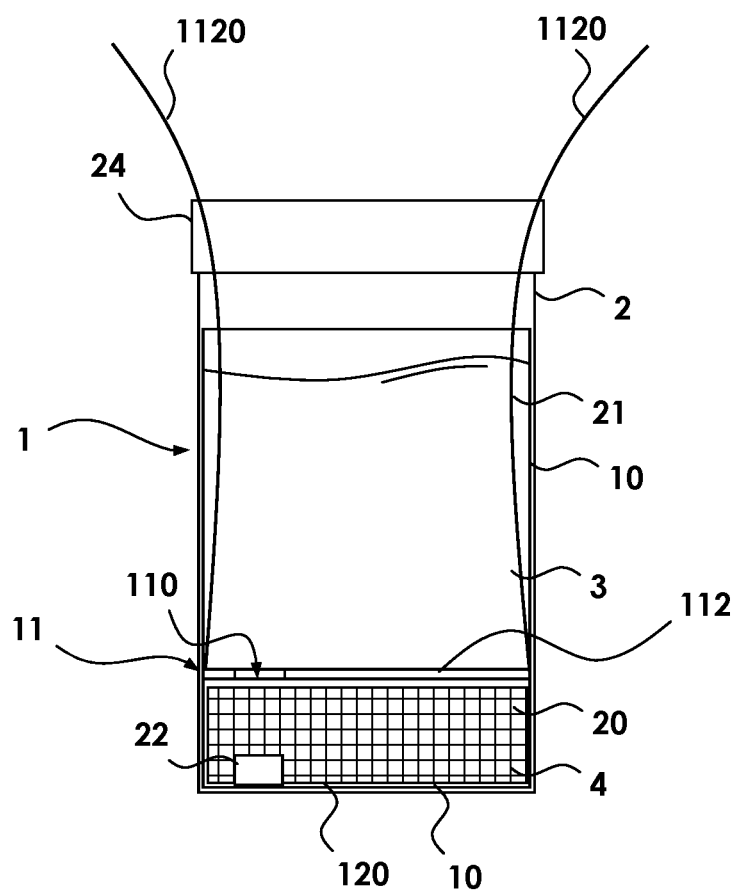

FILTER SYSTEM FOR PREPARING BEVERAGES BASED ON A BEVERAGE BASE

TECHNICAL FIELD

The present disclosure relates to a filter system for preparing beverages based on a beverage base, such as for example coffee powder, soup powder, or tea.

BACKGROUND

It is known from the prior art to insert either suitable tea, soup, or coffee bags or filter-/straining containers (e.g. tea filters, tea strainers, soup filters, etc.) into containers, wherein after the infusion of a warm/hot liquid (e.g. water or milk) into the beverage base, the flavoring and active ingredients can pass into the liquid.

Especially in the preparation of tea, the correct steep time is absolutely essential, since otherwise the tea loses its stimulating effect and loses its aroma and taste. Therefore, in principle, after an individually defined time, the filter or the strainer with the beverage base must be taken out of the warm liquid, so that the beverage base does not release further flavorings and active ingredients into the liquid. However, this is usually cumbersome, and the user relies on using an additional container or plate on which the filter or strainer is placed after use.

SUMMARY

The present disclosure is based on the object to provide a filter system, which eliminates the aforementioned problems and allows a simple and user-friendly, individual adjustment of the steep time of the beverage base within a liquid.

A filter system for preparing beverages based on a beverage base, such as for example coffee powder, soup powder, or tea comprises a filter or strainer provided for use in a container and by which the beverage base is introduced into the heated liquid of a first liquid-receiving compartment which is provided in the container and in which the filtered beverage base develops and releases its ingredients to the liquid.

In the following, filter or strainer is to also be understood as bag-like filter devices such as tea bags and similar type containers for releasing a beverage base into a liquid, wherein the separation depending on needs the filter or the strainer may have a finer or coarser mesh, wire mesh, perforated plate or the like.

A device is provided which can be inserted into the container for forming a second liquid-receiving compartment, wherein the device comprises at least one flow-through opening, which can be closed, for liquid enriched with ingredients so that the beverage base in the second liquid compartment formed by the device cannot develop further.

By the disclosed filter system, it is now possible to individually adjust the steeping process by inserting the insertable device into the container in a simple and user-friendly manner. During the insertion process, the liquid flows from the first liquid-receiving compartment into the second liquid-receiving compartment in which no beverage base is left. After preferably complete absorption of the liquid in the second liquid-receiving compartment, the second liquid-receiving compartment or the device is closed at the at least one flow-through opening.

In a particularly advantageous embodiment, the filter is a filter/straining container which can be inserted into the container, wherein the filter/strainer container is advantageously adapted in shape and size approximately to the container.

In an advantageous embodiment of the invention, the device is a container-shaped receptacle which can be inserted into the container or the filter/strainer container and has at least one flow-through opening.

In a further embodiment, the device is a plate or dish-shaped valve which can be inserted into the container or the filter/strainer container and which has at least one flow-through opening, wherein the valve seals form-fitting and tight against the inner wall of the container.

On the container or on the filter/strainer container a closing means is preferably provided which closes the at least one flow-through opening in a positive locking and/or friction locking manner by introducing the device into the container.

BRIEF DESCRIPTION OF THE DRAWINGS

Other objects, features, advantages and applications of the filter system of the invention will become apparent from the following description of an embodiment with reference to the drawings.

FIG. 2 shows the filter system in the side view in a further embodiment.

DETAILED DESCRIPTION

Figure 1:
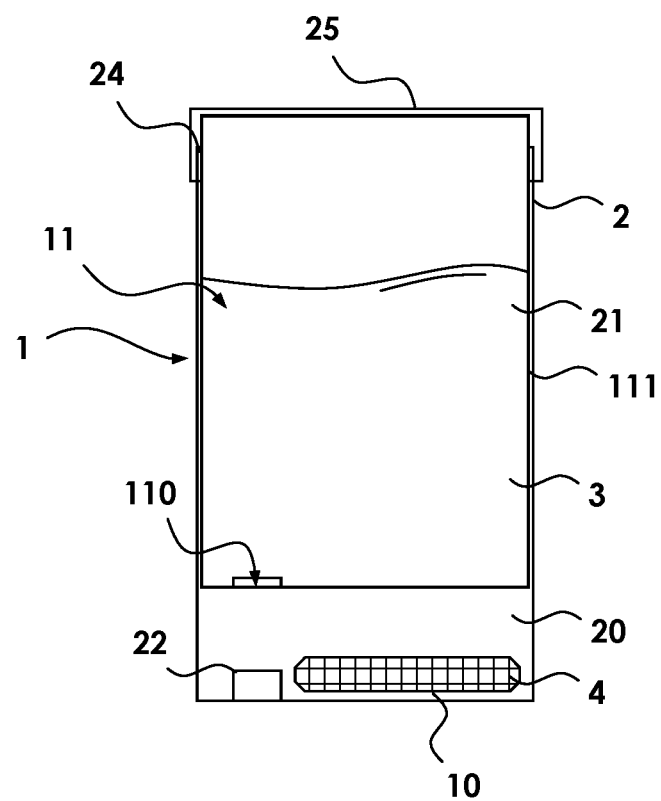
FIG. 1 shows the filter system in the side view in an advantageous embodiment.

As illustrated in FIG. 1, the filter 10 respectively the strainer is a bag-like filter devices such as a tea bag or the like kind of container for dispensing a beverage base 4. Advantageously the device 11 in this exemplary embodiment is configured as a container-shaped receptacle 111 which can be inserted into the container 2 and has at least one flow-through opening 110.

Figure 2A:
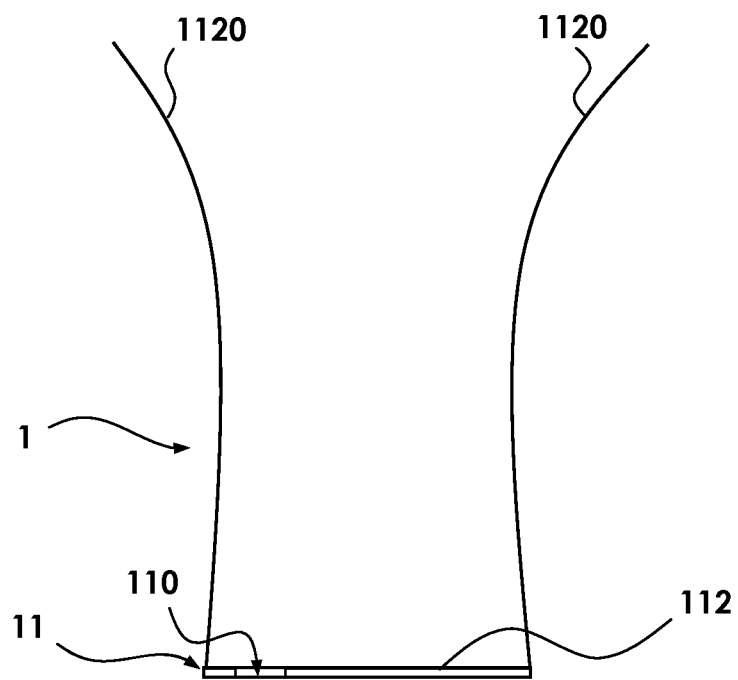
FIG. 2a shows the device as in FIG. 2 in single view.

In the embodiment of the invention shown in FIG. 2, the device 11 is a plate or dish-shaped valve 112 which has at least one flow-through opening 110 and which can be inserted into the filter/strainer container 12, wherein the valve 112 positively and tightly seals on an inner wall of the container 2.

In both illustrated embodiments a closing means 22 is preferably provided on the container 2 or on the filter/strainer container 12 which closes the at least one flow-through opening 110 by positive locking and/or friction locking by introducing the device 11 into the container 2 or the filter/strainer container 12, wherein the closing means 22 is here formed as a plug which upwardly projects into the flow-through opening 110 from the container bottom 23 or from the filter/strainer container bottom 120.

Furthermore, the valve 112 preferably comprises at least one holding member 1120 which upwardly projects above the container edge 24 after insertion into the container 2, and which is very particularly preferably designed to be flexible.

The filter system 1 according to the invention is not limited in its execution to the above-mentioned preferred embodiments. Rather, a variety of design variations are conceivable, which make use of the solution shown even with fundamentally different type of execution.

LIST OF REFERENCE NUMBERS 1 filter system
2 container 3 liquid
4 beverage base
10 filter or strainer
11 device
12 filter/strainer container
20 first liquid-receiving compartment
21 second liquid-receiving compartment
22 closing means/plug
23 container bottom
24 container edge
25 cover
110 flow-through opening
111 container-shaped receptacle
112 plate- or dish-shaped valve
120 filter/strainer container bottom
1120 holding member

The invention claimed is:

1. A filter system for preparing beverages based on a beverage base, comprising:
 a filter or strainer arranged in a container, the filter or strainer being configured to receive the beverage base and release ingredients from the beverage base into a heated liquid within a first liquid-receiving compartment in the container; and
 a device configured to be inserted into the container for forming a second liquid-receiving compartment, the device comprising
  a bottom wall,
  a flow-through opening for the heated liquid enriched with ingredients extending through the bottom wall, and
  a holding member extending upwardly from the bottom wall
 wherein the filter or strainer is arranged at a bottom of the container,
 wherein the device is arranged above the filter or strainer,
 wherein the bottom wall of the device is a plate or dish-shaped valve that seals form-fitting against an inner wall of the container,
 wherein the flow-through opening is arranged in the plate or dish-shaped valve,
 wherein the flow-through opening can be closed so that the beverage base in the first liquid-receiving compartment is sealed from the second liquid-receiving compartment, and
 wherein the holding member upwardly projects above an edge of the container when the device is inserted into the container wherein the device is configured to slide downwardly within the container, and
 wherein the filter or strainer is sealed within the first liquid-receiving compartment in the container underneath the bottom wall of the device when the device is fully inserted into the container.

2. The filter system as in claim 1, wherein the beverage base is a coffee powder, a soup powder or a tea.

3. The filter system as in claim 1, wherein the device is a container-shaped receptacle which can be introduced into the container or the filter/strainer container.

4. The filter system as in claim 1, wherein the holding member is flexible.

5. The filter system as in claim 1,
 wherein a plug is provided on the container or on the filter/strainer container which positively locks and/or friction locks the flow-through opening by introducing the device into the container or the filter/strainer container.

6. The filter system as in claim 5,
 wherein the plug projects from the bottom of the container or from a bottom of the filter/strainer container upwards into the flow-through opening.

7. The filter system as in claim 1,
 wherein the filter or strainer is a bag containing the beverage base.

8. The filter system as in claim 1, further comprising
 a plug which upwardly projects from a bottom of the container,
 wherein the plug projects into the flow-through opening when the device is fully inserted into the container.

9. A filter system for preparing beverages based on a beverage base, comprising:
 a filter or strainer container arranged in an outer container, the filter or strainer container being configured to receive the beverage base and release ingredients from the beverage base into a heated liquid within a first liquid-receiving compartment in the container; and
 a device configured to be inserted into the outer container for forming a second liquid-receiving compartment, the device comprising
  a bottom wall,
  a flow-through opening for the heated liquid enriched with ingredients extending through the bottom wall, and
  a holding member extending upwardly from the bottom wall
 wherein the filter or strainer container is arranged at a bottom of the outer container,
 wherein the device can be inserted into the filter or strainer container,
 wherein the bottom wall of the device is a plate or dish-shaped valve that seals form-fitting against an inner wall of the filter or strainer container,
 wherein the flow-through opening is arranged in the plate or dish-shaped valve,
 wherein the flow-through opening can be closed so that the beverage base in the first liquid-receiving compartment is sealed from the second liquid-receiving compartment, and
 wherein the holding member upwardly projects above an edge of the container when the device is inserted into the container wherein the device is configured to slide downwardly within the container, and
 wherein the filter or strainer is sealed within the first liquid-receiving compartment in the container underneath the bottom wall of the device when the device is fully inserted into the container.

\* \* \* \* \*